United States Patent
Rodriguez Munoz et al.

(10) Patent No.: US 12,411,963 B1
(45) Date of Patent: Sep. 9, 2025

(54) TOKENIZATION OF STRUCTURED DATA PAYLOAD

(71) Applicant: Amazon Technologies, Inc., Seattle, WA (US)

(72) Inventors: Ricardo Rodriguez Munoz, Renton, WA (US); Karthikeyan Mahadevan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1252 days.

(21) Appl. No.: 16/823,114

(22) Filed: Mar. 18, 2020

(51) Int. Cl.
  *G06F 21/62* (2013.01)
  *G06F 21/33* (2013.01)
  *H04L 9/32* (2006.01)

(52) U.S. Cl.
  CPC ........ *G06F 21/6218* (2013.01); *G06F 21/335* (2013.01); *H04L 9/3213* (2013.01); *G06F 2221/2107* (2013.01); *H04L 2209/16* (2013.01)

(58) Field of Classification Search
  CPC . G06F 21/6218; G06F 21/335; H04L 9/3213; H04L 2209/16
  USPC ........................................................ 713/165
  See application file for complete search history.

(56) References Cited

U.S. PATENT DOCUMENTS

| | | | |
|---|---|---|---|
| 10,454,906 B1 * | 10/2019 | Sharfman | H04L 63/0428 |
| 10,607,017 B2 * | 3/2020 | Kumar | H04L 9/0863 |
| 11,461,477 B1 * | 10/2022 | Powers | G06F 21/602 |
| 11,729,149 B2 * | 8/2023 | Mooney | H04L 9/0891 |
| | | | 726/26 |
| 2009/0300045 A1 * | 12/2009 | Chaudhry | H04L 63/10 |
| | | | 707/999.102 |
| 2015/0096056 A1 * | 4/2015 | Mattsson | H04L 63/0807 |
| | | | 726/29 |
| 2017/0353302 A1 * | 12/2017 | Fernandez | H04L 1/0075 |
| 2018/0241760 A1 * | 8/2018 | Stephens | H04L 63/0428 |
| 2018/0276393 A1 * | 9/2018 | Allen | H04L 63/0428 |
| 2019/0332784 A1 * | 10/2019 | Allen | G06F 3/0482 |
| 2020/0159907 A1 * | 5/2020 | Johnson | G06T 5/00 |
| 2020/0177605 A1 * | 6/2020 | Hsiung | H04L 9/065 |
| 2021/0226934 A1 * | 7/2021 | Barnett | H04L 63/0428 |
| 2021/0352049 A1 * | 11/2021 | Aabye | H04L 63/0414 |
| 2022/0004657 A1 * | 1/2022 | Orsinger | G06F 21/6245 |
| 2022/0075899 A1 * | 3/2022 | Richardson | H04W 12/02 |
| 2022/0253545 A1 * | 8/2022 | Sloane | G06F 21/6245 |
| 2022/0350866 A1 * | 11/2022 | Chauhan | G06F 21/554 |
| 2023/0409468 A1 * | 12/2023 | Gonzalez Sanchez | |
| | | | G06F 11/302 |

* cited by examiner

*Primary Examiner* — Dereena T Cattungal
(74) *Attorney, Agent, or Firm* — Davis Wright Tremaine LLP

(57) ABSTRACT

A data producer service obtains a structured data payload containing one or more data fields. The data producer service obfuscates the one or more data fields in accordance with a policy to produce a sealed data payload. A data producer service transmits the sealed data payload to a data consumer service. The data consumer service unseals at least a portion of the obfuscated data fields of the sealed data payload in accordance with an access policy. Sealed data payloads may further be encrypted.

20 Claims, 11 Drawing Sheets

TOKENIZATION OF STRUCTURED DATA PAYLOAD

BACKGROUND

In many computing systems and environments, security for systems and data is important. In some cases, a document may include multiple pieces of data, some of which should be accessible by a first computing entity, others of which should be accessible by a second computing entity, and so on. As multiple services may request access to view portions of a secured document, the methods used to distribute access to secured data or portions of secured data can also need to change. For example, organizations and the systems that share secured information are becoming increasingly complex. Consequently, managing many cryptographic keys and maintaining protection of the secured data involves a significant amount of time and resources to keep up with these changes.

BRIEF DESCRIPTION OF THE DRAWINGS

Various techniques will be described with reference to the drawings, in which.

DETAILED DESCRIPTION

Figure 1:
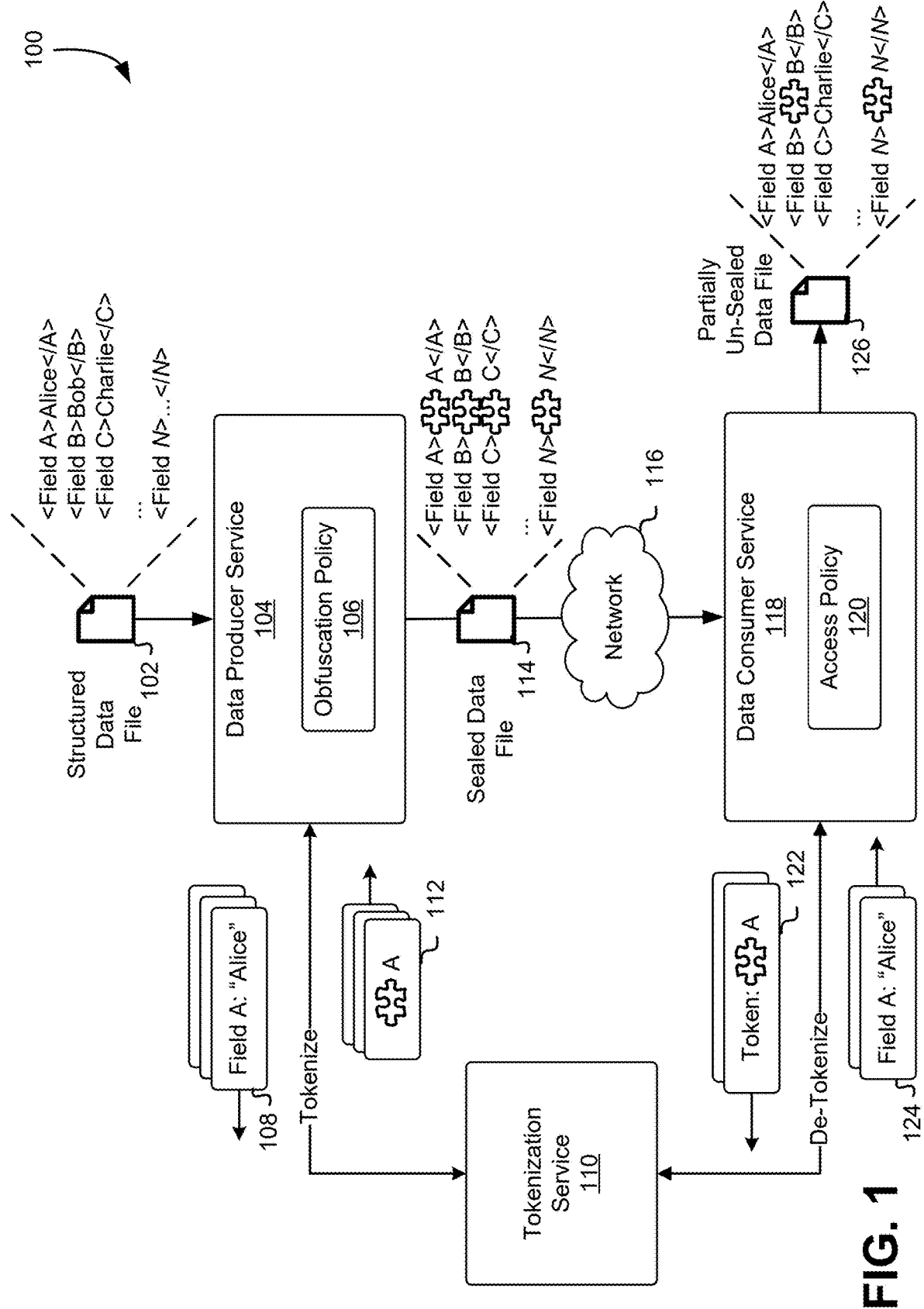
FIG. 1 is a block diagram depicting an embodiment of a computing environment in which a data producer obfuscates a structured data file where a tokenization service can store information for de-obfuscating the obfuscated structured data file and a data consumer can de-obfuscate a portion of the obfuscated structured data file.

Techniques described herein include methods and systems to seal data and unsealed portions of the sealed data. In one example, a data producer service obtains an outbound data payload of unsealed data. The unsealed data can be a payload that is expressed as a reference data structure, such as data fields containing data values. The data producer service can obfuscate the data values in the data fields such that the data is sealed. The data producer service can obfuscate the data values by tokenization, including by utilizing a one-way function to map a data value to a corresponding tokenized data value. The data producer service can obfuscate data fields according to an obfuscation policy that indicates the manner in which various data fields are to be obfuscated, such as by tokenization or encryption. The data producer service can generate a sealed document including the obfuscated data fields. The data producer service can transmit the sealed document to another service, such as a data consumer service. In some embodiments, a software application for program running on a data producer service submits unsealed data for transmission such that the unsealed data is intercepted by a tokenization service interceptor between an application layer and a transport layer such that one or more data fields of the unsealed data are obfuscated to generate sealed data. Sealed data may be transmitted from a data producer service to a recipient, where the recipient may be able to de-obfuscate one or more obfuscated data fields, as described in greater detail herein below.

In at least some embodiments, a data consumer service receives a sealed document over a communications network such as the Internet. The data consumer service can obtain the sealed document as an inbound payload of one or more data packets. A tokenization service interceptor of the data consumer can intercept the sealed document in between the sealed document being routed from a transport layer to an application layer. The data consumer service can de-obfuscate portions of the sealed document. For example, the data consumer service can de-tokenize one or more data fields of the sealed document. The data consumer service can de-obfuscate portions of the sealed document according to an access policy indicating which data fields the data consumer service can access and the manner in which the data consumer service can de-obfuscate such indicated data fields. The data consumer service can transmit the sealed document to another data consumer service.

In one example, the data producer service and the data consumer service can request tokens from a tokenization service. The tokenization service can authenticate the identities of the data producer service and the data consumer service. The tokenization service can determine whether the data producer service is authorized to generate tokens to map between a plaintext data value and a corresponding tokenize data value, or to access a tokenized value corresponding to a given plaintext value. The tokenization service can determine whether the data consumer service is authorized to generate tokens to map between a tokenized data value and a corresponding plaintext data, or to access a plaintext value corresponding to a given tokenized value. The data producer service and the data consumer service can utilize respective local token caches to store token mappings between obfuscated and de-obfuscated data values.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: increasing security of data values in data fields by obfuscating the data fields in a computationally more robust manner than encryption, decreasing processing time for obfuscating or de-obfuscating one or more data fields of a sealed by not de-obfuscating the entire document, reducing resource consumption associated with managing multiple cryptographic materials for sharing the obfuscated document with multiple services where each service is provided varying access to de-obfuscated fields in the sealed document, and increasing security of data by utilizing an intercept service between an application layer and a transport layer to perform de/obfuscation actions according to mutable access/obfuscation policies.

FIG. 1 is a block diagram depicting an embodiment of a system 100 for using a data producer to obfuscate a structured data file where a tokenization service can store information for de-obfuscating the obfuscated structured data file and a data consumer can de-obfuscate a portion of the obfuscated structured data file. An example environment of such a system 100 can include a data producer service 104 that can obtain a structured data file 102. The data producer service 104 can obtain the structured data file 102 by receiving the structured data file 102 by a network communication, via a hardware storage device connected to a computing instance hosting the data producer service 104, or by the data producer service 104 generating the structured data file 102 locally, such as in response to a received instruction in an application programming interface (API) call request. In an at least one embodiment, a data producer service 104 can be a service of a computing resource service provider as described herein.

In an embodiment, the structured data file 102 expresses a data payload as a reference data-structure. The structured data file 102 may include tags to define objects and the data within each object, such as a text-based database, e.g., a data file formatted according to extensible markup language (XML). Other examples of structured data file formats can include comma separated values (CSV), tab separated values (TSV), JavaScript Object Notation (JSON), Microsoft® Excel® spreadsheet (XLS), and the like. In an embodiment, the structured data file 102 includes a plurality of fields (e.g., Field A, Field B, and Field C) wherein each field can be assigned a data value (e.g., Field A=Alice, Field B=Bob, Field C=Charlie). The data value can be a number, character, or string. For example, the data value can be a name of a person, a geographic mailing address, item name, item identifier, item weight, etc. Data fields may include sensitive data, such as credit card numbers, social security numbers, and other various types of data of a sensitive and/or private nature.

In an embodiment, a data producer service 104 obtains structured data file 102 and seals one or more fields of the structured data file 102, such as in accordance with an obfuscation policy 106. The obfuscation policy 106 can indicate a manner in which fields of the structured data file 102 are obfuscated by the data producer service 104, such as by tokenization or encryption. For example, an obfuscation policy may include a set of tuples which define, for a set of data types, a manner in which to obfuscate corresponding data values. In at least one embodiment, an obfuscation policy indicates that a data field or portion thereof should be obfuscated. In at least one embodiment, an obfuscation policy indicates that a data field or portion thereof should be obfuscated according to a specific obfuscation function, which may indicate a particular type of one-way function and/or additional data that should be encoded alongside a data value as part of performing the obfuscation function, such as the inclusion of a salt value, nonce, etc. In an embodiment, the obfuscation policy 106 indicates that the plurality of fields including Fields A, B, and C are to be tokenized.

In an embodiment, a data producer service 104 can request the corresponding tokens for the unsealed data values 108 of these fields from a tokenization service 110. In an embodiment, tokenization service 110 uses an obfuscation function to map a plaintext data value to a corresponding obfuscated data value, thereby sealing the data field. Examples of obfuscation functions include one-way functions that are not necessarily one-way in the strict mathematical sense, but that exhibit properties (such as collision resistance, preimage resistance and second preimage resistance) that render the function useful in contexts in which the various techniques of the present disclosure are applied. In an embodiment, the tokenization service 110 provides the sealed data fields 112 to the data producer service 104. In at least one embodiment, the data producer service 104 can obtain the token from a token cache local to the data producer service 104. For example, the data producer service 104 can query a database of the token cache based on a plaintext data value to identity a corresponding tokenized data value for the plaintext data value. By utilizing the local token cache, the data producer service 104 can avoid having to send a token request to the tokenization service 110.

The data producer service 104 can generate a sealed data file 114 using the sealed data fields 112 corresponding to the unsealed data fields 108 indicated in the obfuscation policy 106. In an embodiment, the obfuscation policy 106 can indicate that some of the data fields in the structured data file 102 obtained by the data producer service 104 are not to be obfuscated, in which case the combination of sealed data fields 112 and data fields not marked for obfuscation by the obfuscation policy 106 would result in the data producer service generating a partially sealed data file. In an alternate embodiment, if the data producer service 104 obtains a structured data file 102 including data fields that are not indicated to be obfuscated by the obfuscated policy 106, such non-indicated data fields can be prevented from being transmitted or otherwise provided by the data producer service 104, thereby preventing a partially sealed data file being generated, transmitted, or otherwise provided by the data producer service 104. Data producer service 104 may be implemented as any suitable electronic system, such as those described in connection with FIG. 11.

In an embodiment, the data producer service 104 transmits the sealed data file 114 over a network 116 to a data consumer service 118. Network 116 can be any suitable network, such as a virtual private network (VPN), a local area network (LAN), an internet connection, or some combination thereof linking the data producer service 104 to the data consumer service 118. In at least one embodiment, data consumer service 118 obtains sealed data file 114 and in accordance with an access policy 120, de-obfuscates the sealed data file 114 to obtain a partially unsealed data file 126. The access policy 120 and the obfuscation policy 106 can be different policies. In an embodiment, the access policy 120 and the obfuscation policy 106 can refer to the same policy. In an embodiment, the data consumer service 118 requests that the tokenization service 110 provide the de-obfuscated data values corresponding to the obfuscated data values in tokenized data 122, e.g., the tokenized Field A and Field C. The tokenization service can provide the de-obfuscated data values 124 to the data consumer service 118, e.g., Field A=Alice and Field C=Charlie. In an alternate embodiment, the data consumer service 118 can obtain the corresponding plaintext for a tokenized data vale from a token cache local to the data consumer service 118. For example, the data consumer service 118 can query a database of the token cache based on a tokenized data value to identify a plaintext data value corresponding for the tokenized data value. By utilizing the local token cache, the data consumer service saves 118 sending a token request to the tokenization service 110. In at least one embodiment, data consumer service 118 is not able to fully unseal the sealed data file 114, as its permissions may indicate that data consumer service 118 lacks permissions to access one or more sealed data values (e.g., sealed value for Field B illustrated in FIG. 1) of the sealed data file 114. In an at least one embodiment, a data consumer service 118 can be a service of a computing resource service provider operating on a customer device as described herein.

The data consumer service 118 can generate the partially unsealed data file 126 using the de-obfuscated data values 124. In an embodiment, the data consumer service 118 utilizes a cache to store the mapping of the obfuscated data values 122 and the corresponding de-obfuscated data values 124. In an embodiment, the data consumer service 118 utilizes the local token cache to de-obfuscate tokenized data without requesting the tokenization service for the mapping between tokenized data and corresponding plaintext data. In some embodiments, sealed data file 114 is received by data consumer service 118 with an indication that it is to be transmitted to a software application or programming running on the data consumer service 118. In at least some cases, sealed data file 114 is intercepted between a transport layer and application layer and de-obfuscated so that a partially unsealed data file 126 is instead routed to the application or program, thereby providing the software or program access to the some data but not others, according to one or more policies that dictate which data fields the data consumer service 118 should have access to. Data consumer service 118 may be implemented as any suitable electronic system, such as those described in connection with FIG. 11.

Figure 2:
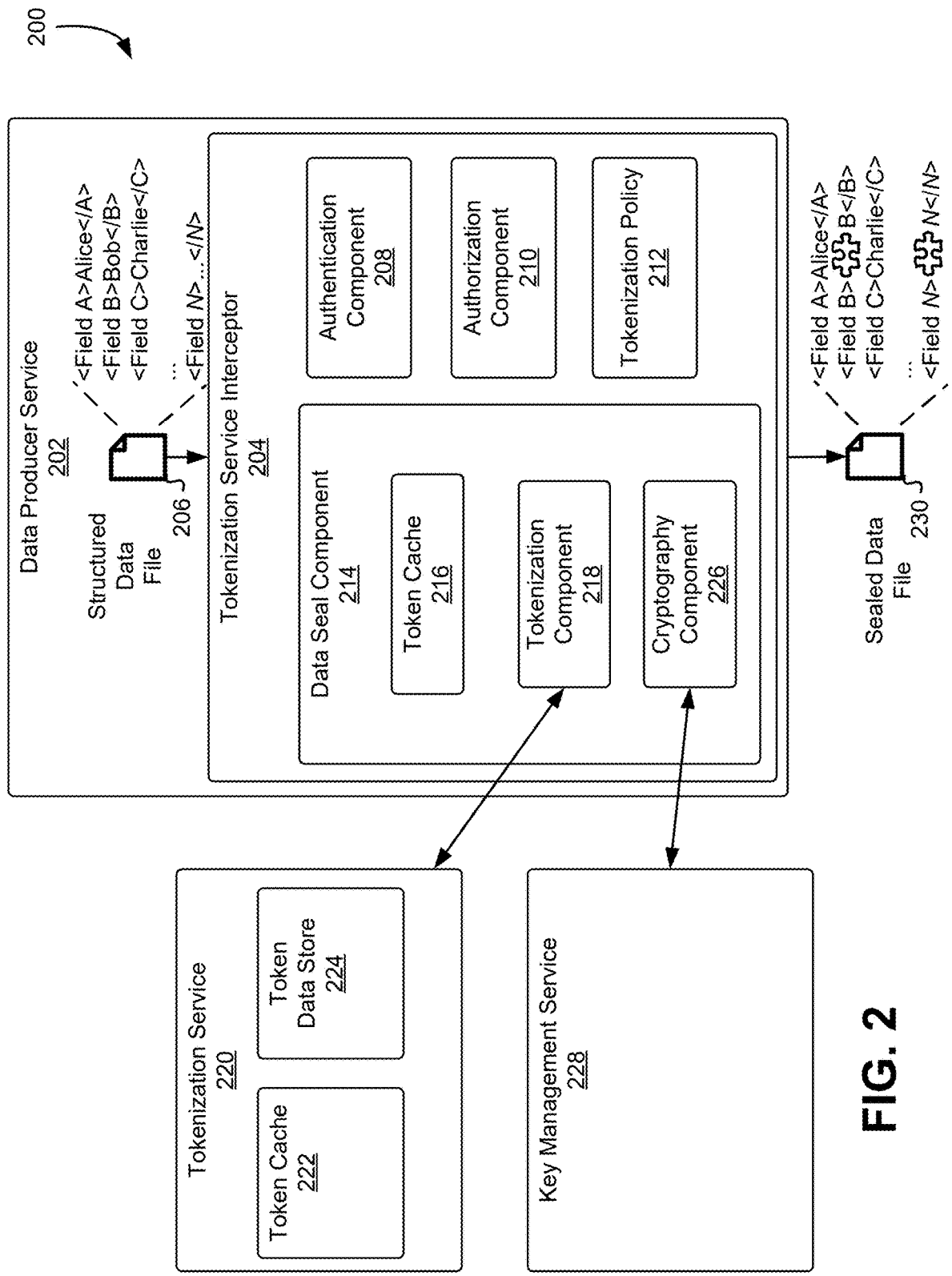
FIG. 2 is a block diagram depicting an embodiment of a system for using a data producer service to seal a structured data file.

FIG. 2 is a block diagram depicting an embodiment of a system 200 for using a data producer service to seal a structured data file. An example environment of such a system 200 can include a data producer service 202, which may be implemented in accordance with those described in connection with FIG. 1. Data producer service 202 can host a tokenization service interceptor 204. For example, data producer service 202 can launch, terminate, delete, modify, read, and/or otherwise access computing resources to configure a tokenization service interceptor 204.

The tokenization service interceptor 204 can be a software application executable by the data producer service 202. For example, one or more computer systems loaded with computer-executable instructions in memory and may be implemented as code (e.g., computer-executable instructions, one or more computer programs, or one or more applications) executing collectively on one or more processors, by hardware, software, or combinations thereof can launch the executable instructions to effect operation of the tokenization service interceptor 204. The code, in at least one embodiment, is stored on a computer-readable storage medium in the form of a computer program comprising a plurality of computer-readable instructions executable by one or more processors of the data producer service 202. The computer-readable storage medium, in at least one embodiment, is a non-transitory computer-readable medium. In at least one embodiment, at least some of the computer-readable instructions usable to perform operations of the tokenization service inceptor 204, or components thereof, are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

The tokenization service interceptor 204 can intercept an outbound data payload, such as structured data file 206 that is being routed from an application layer to a transport layer. The structured data file 206 can include a plurality of fields. One or more fields of the plurality of fields can contain sensitive data. For example, sensitive data can refer to identifying information, such as a person's full name, address, social security number, telephone number, etc. Sensitive data can be labeled or otherwise indicated as sensitive by metadata included with the structured data file 206.

In an embodiment, the tokenization service interceptor 204 includes an authentication component 208 to, for example, verify the identity of the data producer service 202 within a service provider network. Examples of authentication operations include the data producer service verifying the provenance of the unsealed data and authenticating the identity of the data producer service with a computing resource service provider and/or tokenization service.

In an embodiment, the tokenization service interceptor 204 includes an authorization component 210 to determine, based on metadata included with the structured data file 206, that the system is permitted to perform obfuscation actions on the structured data file 206. Examples of authorization operations include accessing an obfuscation policy to verify that the data producer service is permitted to operate on one or more data fields contained in the unsealed document, to communicate with a tokenization service, to communicate with a key management service, or to communicate with another service, such as a data consumer service. The obfuscation policy can include rules or policies regarding the manner in which data fields can be obfuscated, such as by encryption or tokenization as described herein.

In an embodiment, the tokenization service interceptor 204 includes a tokenization policy 212 that indicates, for example, which data fields the data producer service is permitted to perform obfuscation actions on within the structured data file 206 and the manner in which to perform such obfuscation actions. For example, certain data fields can be indicated for encryption and other data fields can be indicated for tokenization. The manner in which a data field can be obfuscated can be included in the tokenization policy.

In an embodiment, the tokenization service interceptor 204 includes a data seal component 214. The data seal component can process obfuscation actions on the structured data file 206. The data seal component 214 can determine if a mapping for a plaintext data value and a corresponding obfuscated data value, such as a token, is stored in a token cache 216. The token cache can be memory allocated to the data producer service 202. If such a mapping is stored, the data seal component 214 can seal an unsealed data field using the cached token mapping. If a token mapping for a plaintext data value and a corresponding obfuscated data value are not locally stored at the data producer service, the data producer service 202 can utilize a tokenization component 218 of the data seal component 214 to request the mapping from a tokenization service 220. In an embodiment, the tokenization component 218 can send an individual request to the tokenization service 220 for the tokenized data values for each field of a structured data file 206. In an alternate embodiment, the tokenization component 218 can send a batch request specifying all data fields to be tokenized.

The tokenization service 220 can store a plaintext data value and tokenized data value in a token cache 222 or a token data store 224. For example, a token cache can store token mappings according to the frequency in which the token mappings are accessed by services, such as discarding the least recently used mapping first (LRU). Additional examples of frequency based cache methods include first in first out (FIFO), last in first out (LIFO), first in last out (FILO), time aware least recently used (TLRU), most recently used (MRU), etc. In at least some embodiments, token cache 216 stores in memory a mapping between unsealed data values and obfuscated data values which are not merely limited to tokens, but may include mappings between plaintext data and hash outputs, ciphertexts, and more.

In an embodiment, data producer service 202 utilizes a cryptography component 226 to interface with a key management service 228 to access digital cryptographic information that can be used in obfuscation actions, such as in accordance with the tokenization policy 212. Key management service may include one or more security modules such as hardware security modules (HSMs) which securely store cryptographic key material that can be used for encryption and decryption. Cryptographic key material stored in HSMs may be programmatically unexportable. For example, the data producer service 202 utilizes cryptographic keys to encrypt particular data fields specified in the tokenization policy 212. The data producer service 202 can utilize cryptographic keys to decrypt a structured data file 206 if the data producer service 202 obtains an encrypted structured data file 206.

In an embodiment, the data producer service 202 utilizes the tokenization information obtained from the tokenization service 220 to generate a sealed data file 230. If the tokenization policy 212 indicated particular data fields to be encrypted, the data producer service 202 utilizes obtained cryptographic information from the key management service 228 to encrypt such data fields when generating the sealed data file 230. In an embodiment, after the data producer service 202 generates the sealed data file 230, the data producer service encrypts the sealed data file using the cryptography component 226 to create an encrypted sealed data file which may be in accordance with a protocol specified by a cryptographically protected communications session (e.g., TLS) which the data producer service 202 uses to transmit the encrypted sealed data file over a network such as the Internet. One or more data fields of a plurality of data fields can contain sensitive data (e.g., Field C). Sensitive data can be labeled or otherwise indicated as sensitive by metadata included with the structured data file 206 and/or sealed data file 230. In at least some embodiments, one or more data files includes non-sensitive data that is not tokenized and transmitted as plaintext. In some cases, tokenization policy 212 encodes a rule that all non-sensitive data is exempt from obfuscation. In some cases, some or all non-sensitive data is obfuscated according to tokenization policy 212. Examples of non-sensitive data may include timestamps or other information associated with generating the structured data file 206, although such information may, depending on the context and/or use cases, be considered sensitive data. Whether data is sensitive or not may be encoded in a policy, or may be determined by an external component, such as another service that provides lists of sensitive fields to tokenization service interceptor 204. FIG. 2, according to at least one embodiment, shows an illustrative example in which Field A includes non-sensitive data which can be transmitted in plaintext or otherwise exempt from obfuscation by tokenization service interceptor 204.

Figure 3:
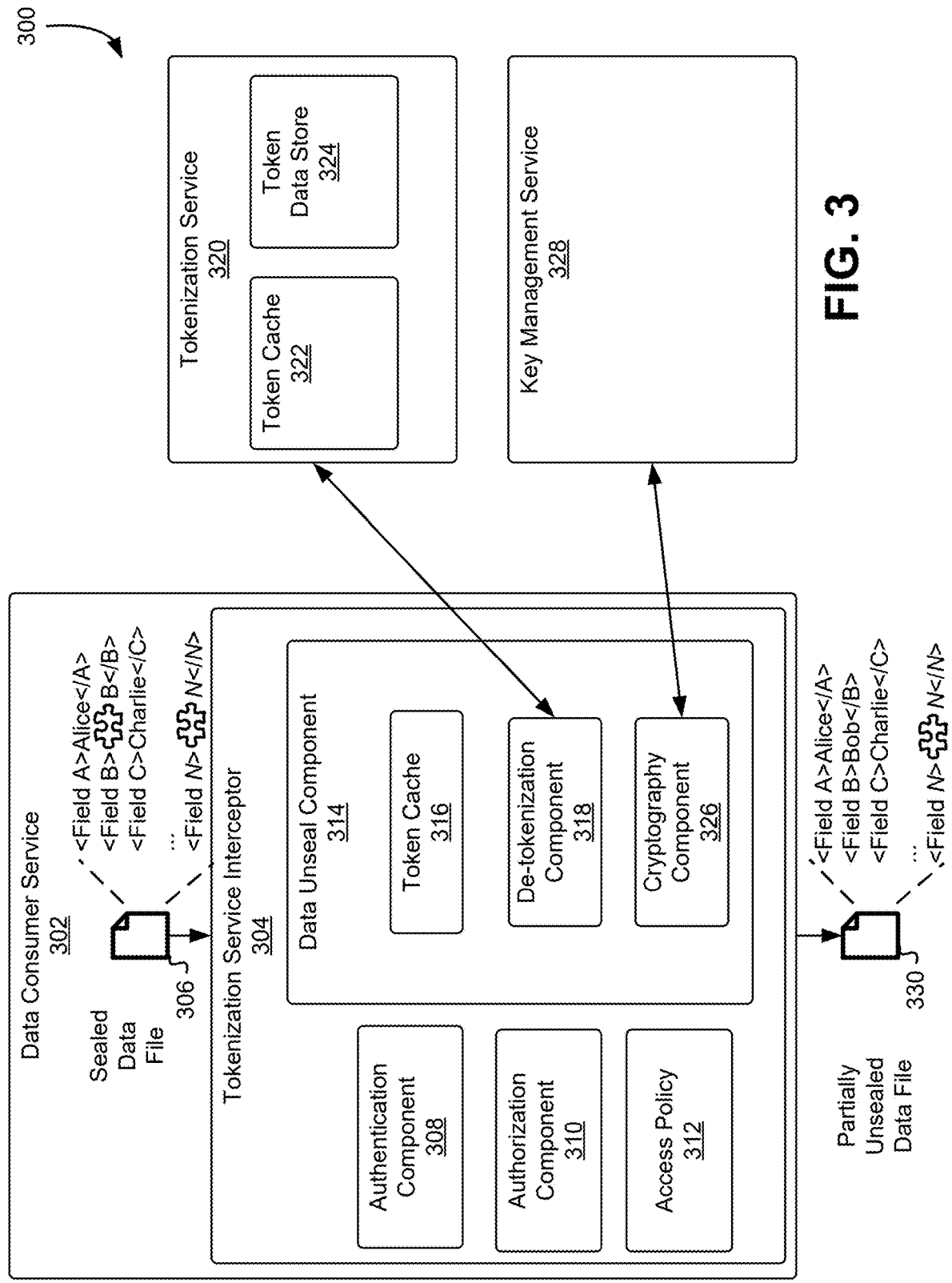
FIG. 3 is a block diagram depicting an embodiment of a system for using a data consumer service to unseal a portion of a sealed data file.

FIG. 3 is a block diagram depicting an embodiment of a system 300 for using a data consumer service to unseal a portion of a sealed data file. An example environment of such a system 300 can include a data consumer service 302, such may be implemented in accordance with those described in connection with FIG. 1. The data consumer service 302 can host a tokenization service interceptor 304. For example, data consumer service 302 can launch, terminate, delete, modify, read, and/or otherwise access computing resources to configure a tokenization service interceptor 304. The tokenization service interceptor 304 can intercept an inbound data payload, such as sealed data file 306, which is being routed from a transport layer to an application layer. The sealed data file 306 can include a plurality of fields, similar to sealed data file 114 discussed above regarding FIG. 1. One or more data fields of a plurality of data fields included in the sealed data file 306 can contain sensitive data (e.g., Field C). Sensitive data can be labeled or otherwise indicated as sensitive by metadata included with the sealed data file 306. Non-sensitive data, such as a timestamp or other information associated with generating the sealed data file 306, may not be tokenized or sealed (e.g., Field A=Alice).

In an embodiment, the tokenization service interceptor 304 includes an authentication component 308 to, for example, verify the identity of the data consumer service 302 within a service provider network. Examples of authentication operations include the data consumer service verifying the provenance of the sealed data and authenticating the identity of the data consumer service with a computing resource service provider and/or tokenization service.

The tokenization service interceptor 304 can be a software application executable by the data consumer service 302. For example, one or more computer systems loaded with computer-executable instructions in memory and may be implemented as code (e.g., computer-executable instructions, one or more computer programs, or one or more applications) executing collectively on one or more processors, by hardware, software, or combinations thereof can launch the executable instructions to effect operation of the tokenization service interceptor 304 or components thereof. The code, in at least one embodiment, is stored on a computer-readable storage medium in the form of a computer program comprising a plurality of computer-readable instructions executable by one or more processors of the data producer service 302. The computer-readable storage medium, in at least one embodiment, is a non-transitory computer-readable medium.

In an embodiment, the tokenization service interceptor 304 includes an authorization component 310 to determine, based on metadata included with the sealed data file 306, that the system is permitted to perform de-obfuscation actions on the sealed data file 306. Examples of authorization operations include accessing an access policy to verify that the data consumer service is permitted to operate on one or more data fields contained in the sealed document, to communicate with a tokenization service, to communicate with a key management service, or to communicate with another service, such as another data consumer service. The access policy can include rules or policies regarding the manner in which sealed data fields can be de-obfuscated, such as by decryption or de-tokenization as described herein.

In an embodiment, the tokenization service interceptor 304 includes an access policy 312 that indicates, for example, which data fields the data consumer service 302 is permitted to perform de-obfuscation actions on within the sealed data file 306 and the manner in which to perform such de-obfuscation actions.

In an embodiment, the tokenization service interceptor 304 includes a data unseal component 314. Data unseal component 314 can process de-obfuscation actions on the sealed data file 306. The data unseal component 314 can determine if a mapping for a plaintext data value and a corresponding obfuscated data value, such as a token, is stored in a token cache 316. The token cache 316 can be memory allocated to the data consumer service 302. If such a mapping is stored, the data unseal component 314 can unseal a sealed data field using the cached token mapping. If a token mapping for a plaintext data value and a corresponding obfuscated data value are not locally stored at the data consumer service 302, the data consumer service 302 can utilize a de-tokenization component 318 of the data unseal component 314 to request the mapping from a tokenization service 320. In an embodiment, the de-tokenization component 318 can send an individual request to the tokenization service 320 to de-tokenize each field of a structured data file 306. In an alternate embodiment, the de-tokenization component 318 can send a batch request to the tokenization service 320 that specifies all data fields to be de-tokenized. The tokenization service 320 can store a plaintext data value and tokenized data value in a token cache 322 or a token data store 324. For example, a token cache can store token mappings according to the frequency in which the token mappings are accessed by services, such as discarding the least recently used mapping first (LRU). Additional examples of frequency-based cache methods include first in first out (FIFO), last in first out (LIFO), first in last out (FILO), time aware least recently used (TLRU), most recently used (MRU), etc.

In an embodiment, the data consumer service 302 utilizes a cryptography component 326 to interface with a key management service 328 to access digital cryptographic information that can be used in de-obfuscation actions, such as in accordance with the access policy 312. In an embodiment, the key management service 328 is similar to the key management service 228. The data consumer service 302 can utilize cryptographic keys to decrypt particular data fields specified in the access policy 312. The data consumer service 302 can utilize cryptographic keys to decrypt a sealed data file 306 if the data consumer service 302 obtains an encrypted sealed data file 306.

In an embodiment, the data consumer service 302 utilizes the tokenization information obtained from the tokenization service 320 to unseal a portion of the sealed data file 306 to generate a partially unsealed data file 330. If the access policy 312 indicated particular data fields to be decrypted, the data consumer service 302 utilizes obtained cryptographic information from the key management service 328 to decrypt such data fields when generating the partially unsealed data file 330. In an embodiment, before the data consumer service 302 generates the partially unsealed data file 330, the data consumer service decrypts the sealed data file 306 using the cryptography component 326, such as when the data consumer service 302 obtains an encrypted sealed data file 306.

In an embodiment, the data consumer service 302 utilizes the tokenization information obtained from the tokenization service 320 to regenerate the sealed data file 306. The data consumer service 302 can transition to a role of a data producer service after the data consumer service 302 performs one or more de-obfuscation actions and processes unsealed data values. In an alternate embodiment, the data consumer service 302 utilizes a cache to store a copy of the sealed data file 306 before the data consumer service performs de-obfuscation actions. The data consumer service 302 can transmit the regenerated or cached sealed data file 306 from a network layer or transport layer as an outbound data payload to another service. The data consumer service 302 can encrypt the outbound data payload such that data consumer service transmits an encrypted and obfuscated data payload to another service. The outbound data payload can include additional information indicative of the data consumer service 302 processing one or more unsealed data fields of the sealed data file 306. For example, the additional information can be included in metadata of the sealed data file, sent in an additional sealed data file, or otherwise included with the transmission of the sealed data file 306 to the additional service.

Figure 4:
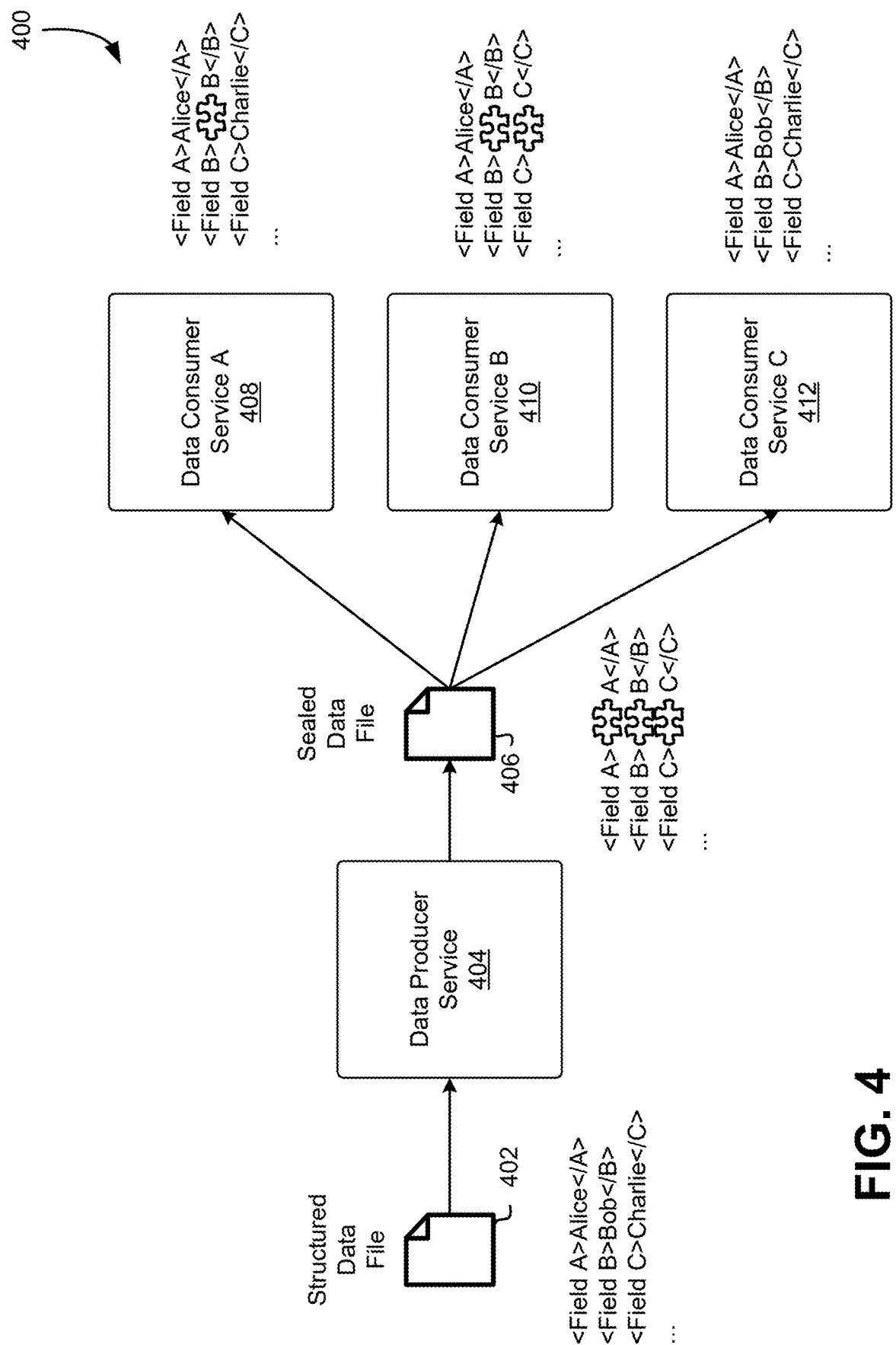
FIG. 4 is a block diagram depicting an embodiment of a system for using a data producer to seal a structured data file and a plurality of data consumer services are able to unseal varying portions of the sealed data file.

FIG. 4 is a block diagram depicting an embodiment of a system 400 for using a data producer to seal a structured data file and a plurality of data consumer services are able to unseal varying portions of the sealed data file according to different policies. An example environment of such a system 400 can include a data producer service and a plurality of data consumer services which may be implemented in accordance with those described in connection with FIG. 1.

In an embodiment, a structured data file 402 containing a plurality of plaintext data fields is obtained by a data producer service 404. The data producer service 404 can utilize the components described in FIG. 2 to produce a sealed data file 406 whereby the plaintext data fields are obfuscated. The data producer service 404 can provide the sealed data file 406 to one or more data consumer services, such as data consumer service A 408, data consumer service B 410, and data consumer service C 412. Each data consumer service of a plurality of data consumer services can be authorized to view different subsets of sealed data fields in a given sealed data file.

In an embodiment, the data consumer service A 408 includes a first policy configured to authorize the data consumer service A 408 to de-obfuscate a first portion of the obfuscated data fields contained in sealed data file 406 obtained from the data producer service 404. For example, the data consumer service A 408 can obtain the plaintext data values of Field A and Field C but not Field B.

In an embodiment, the data consumer service B 410 includes a second policy configured to authorize the data consumer service B 410 to de-obfuscate a second portion of the obfuscated data fields contained in sealed data file 406 obtained from the data producer service 404. The policy of the data consumer service B 410 can be different than the policy of the data consumer service A 408. For example, the data consumer service B 410 can obtain the plaintext data values of Field A but not Field B nor Field C. As illustrated in FIG. 4 and in accordance with at least one embodiment, data consumer service B 410 obtains a different view of the sealed data file 406 when de-obfuscated according to the policy of data consumer service B 410 that differs from the policy of data consumer service A 408.

In an embodiment, the data consumer service C 412 includes a third policy configured to authorize the data consumer service C 412 to de-obfuscate a third portion of the obfuscated data fields contained in sealed data file 406 obtained from the data producer service 404. The policy of the data consumer service C 412 can be different than the policy of the data consumer service A 408 and data consumer service B 410. For example, the data consumer service C 412 can obtain the plaintext data values of Field A, Field B, Field C. A data consumer service, such as data consumer service C 412, can be authorized to de-obfuscate all sealed data fields included in a sealed data file 406, to de-obfuscate the same data fields as another data consumer service, or to de-obfuscate a union of data fields of two or more other data consume services.

Figure 5:
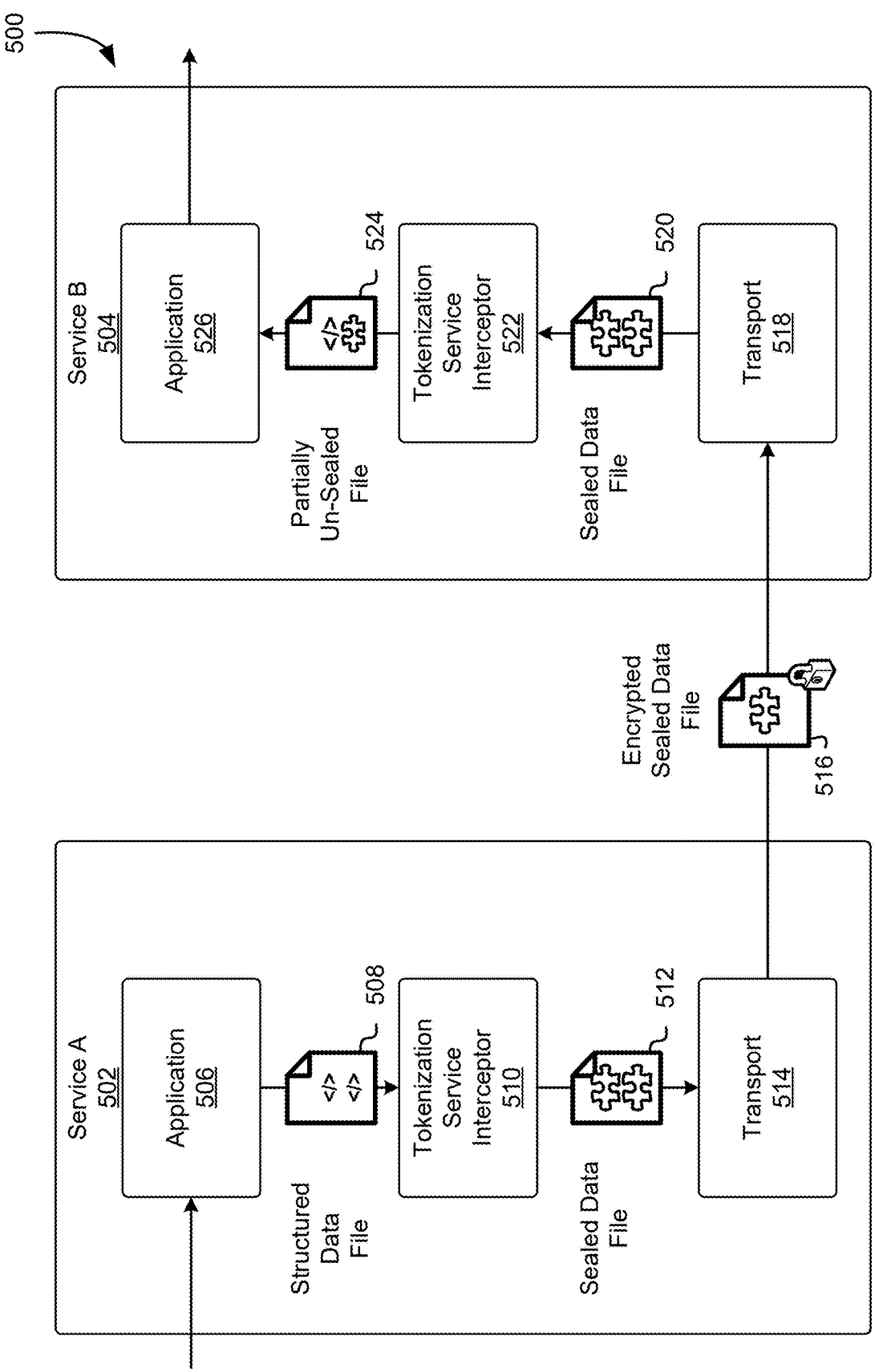
FIG. 5 is a block diagram depicting an embodiment of a system for using a first service to intercept an unsealed structured data file, seal the data file, and transport an encrypted and sealed data file to a second service, where the second service intercepts the sealed data file between a transport layer and an application layer of the second service.

FIG. 5 is a block diagram depicting an embodiment of a system 500 for using a first service to intercept an unsealed structured data file, seal the data file, and transport an encrypted and sealed data file to a second service, where the second service intercepts the sealed data file between a transport layer and an application layer of the second service. An example environment of such a system 500 can include a service A 502, an example of which being a data producer service, and a service B, an example of which being data consumer service, which may be implemented in accordance with those described in connection with FIG. 1.

In an embodiment, service A 502 includes an application layer 506. The application layer 506 can be an application layer of a model that characterizes and standardizes communication functions of a telecommunication or computing system without regard to underlying internal structure and technology. An example of such a model is the Open Systems Interconnection model (OSI model). The application layer 506 can specify shared communications protocols and interface methods used by hosts in a communications network. The application layer 506 can obtain data, structured or unstructured, to produce structured data file 508.

Communication traffic, such as structured data file 508, routed from the application layer 506 can be intercepted by a tokenization service interceptor 510. The tokenization service interceptor 510 can be similar to a tokenization service interceptor described above regarding FIG. 2. The structured data file 508 can be similar to a structured data file as described above. The tokenization service interceptor 510 can intercept traffic, such as structured data file 508, based on a characteristic, identifier, or associated metadata. In an embodiment, a tokenization service interceptor 510 can obfuscate the structured data file 508 to produce a sealed data file 512. The tokenization service interceptor can produce the sealed data file 512 by obfuscating plaintext data values within the structured data file 508, such as described above regarding FIG. 2. The tokenization service interceptor 510 can provide the sealed data file 512 to a destination indicated by the application layer 506, such as a transport layer 514. In an embodiment, the tokenization service interceptor 510 can provide the sealed data file 512 to an encryption module. For example, the tokenization service interceptor 510 can provide the sealed data file 512 to an encryption module, providing the sealed data file 512 by sending the sealed data file 512 over a network protocol, such as sending by transport layer security (TLS) as a TLS datagram.

In an embodiment, the transport layer 514 can be a transport layer of a model that characterizes and standardizes communication functions of a telecommunication or computing system without regard to underlying internal structure and technology, such as the Open Systems Interconnection model (OSI model). The transport layer 514 can utilize communication links (e.g., transmission control protocol (TCP) connections and/or transport layer security (TLS) or other cryptographically protected communication sessions), using one or more computer networks or direct connections. The transport layer 514 can connect service A 502 to service B via a connection with transport layer 518 of service B 504. In an embodiment, the transport layer 514 encrypts the sealed data file 512 such that the transport layer 514 transmits an encrypted sealed data file 516 to the transport layer 518. The transport layer 514 can produce the encrypted sealed data file 516 by utilizing an encryption protocol and a cryptographic key, such as a symmetric key or a portion of an asymmetric key, e.g., a public key where service B 504 can access the corresponding private key.

In an embodiment, the transport layer 518 can receive and decrypt the encrypted sealed data file 516. The transport layer 518 can decrypt the encrypted sealed data file 516 by a corresponding encryption protocol used to encrypt the sealed data file 512 and a corresponding cryptographic key, such as a symmetric key or a portion of an asymmetric key, e.g., a private key accessible to service B 504. Once decrypted, the transport layer 518 routes the sealed data file 520 to a destination of service B, such as application layer 526.

In an embodiment, tokenization service interceptor 522 intercepts the sealed data file 520 such that the sealed data file is prevented from reaching the application layer 526. The tokenization service interceptor 522 can be similar to the tokenization service interceptor 304 described above regarding FIG. 3. A policy of the tokenization service interceptor 522 can indicate which data fields of the sealed data file 520 service B is authorized to access. In an embodiment, the tokenization service inceptor 522 de-obfuscates the portions of the sealed data file that service B 504 can access, such as described above in FIG. 3. In an embodiment, the tokenization service interceptor 522 routes the partially unsealed file 524, including the portions of the sealed data file that service B 504 can access, to the indicated destination of service B, such as application layer 526. The application layer 526 can generate data, structured or unstructured, from the partially unsealed file 524, such as to process plaintext data values of the partially unsealed file 524.

Figure 6:
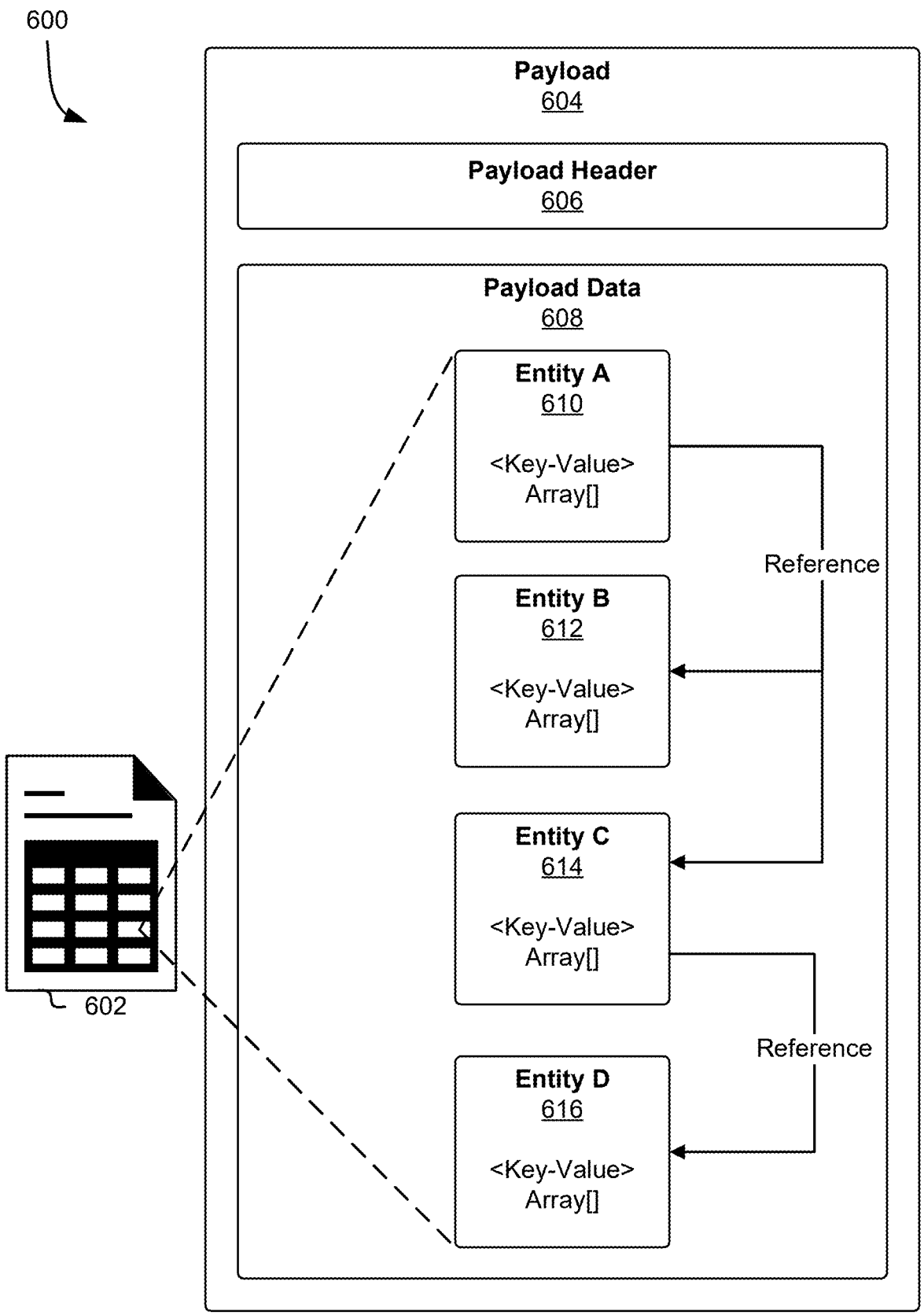
FIG. 6 is a block diagram depicting an embodiment of a payload, wherein payload data comprises one or more entities, each entity including a key value and an array of one or more references that link an entity to another entity in the payload data.

FIG. 6 is a block diagram depicting an embodiment 600 of a payload, wherein payload data comprises one or more entities, each entity including a key value and an array of one or more references that link an entity to another entity in the payload data. An embodiment 600 of a payload document 602 can include payload 604. A payload document 602 can be similar to a structured data file 102 discussed above. In an embodiment, payload 604 can comprise a payload header 606 and payload data 608. Examples of a payload 604 include payload of application layer protocols, including Hypertext Transfer Protocol (HTTP, File Transfer Protocol (FTP), Simple Mail Transfer (SMTP), Post Office Protocol (POP), Domain Name System (DNS), Secure Shell (SSH), etc. A payload header 606 can include metadata regarding information contained within the data fields, such as information about how the payload was generated, destination information for the payload, timestamp, etc. An example of a payload header 606 is an HTTP header.

In an embodiment, payload data 608 is structured. Examples of structured data formats include XML, CSV, TSV, JSON, XLS, etc. as described herein. Payload data 608 can be structured into one or more entities, such as entity A 610, entity B 612, entity C 614, and entity D 616. Each entity can include one or more data fields. A data field can be of one or more data types. A given data field of a given data type can contain a key value indicative of a data value. A data value can include numbers, characters, or strings. A data value can be in a standard format, such as according to a data type, e.g., a telephone number, social security number, or similar identifier. An obfuscated data field can refer to an obfuscated data value of the data field with an associated plaintext data type or can refer to an obfuscated data value and an obfuscated data type.

In an embodiment, an entity included in payload data 608 comprises one or more data fields providing a reference, link, or association with another entity. Such references can be included in an array of a data field of an entity. For example, entity A 610 can include a reference that associates entity A 610 with entity B 612 and entity C 614. References can be pointers to another entity without the other entity storing a corresponding reference. For example, entity A 610 includes a reference to entity C 614 while entity C 614 can include a reference to entity D 616. In such an example, entity D 616 may not include a reference to entity C 614 and/or entity C 614 may not include a reference to entity A 610.

Figure 7:
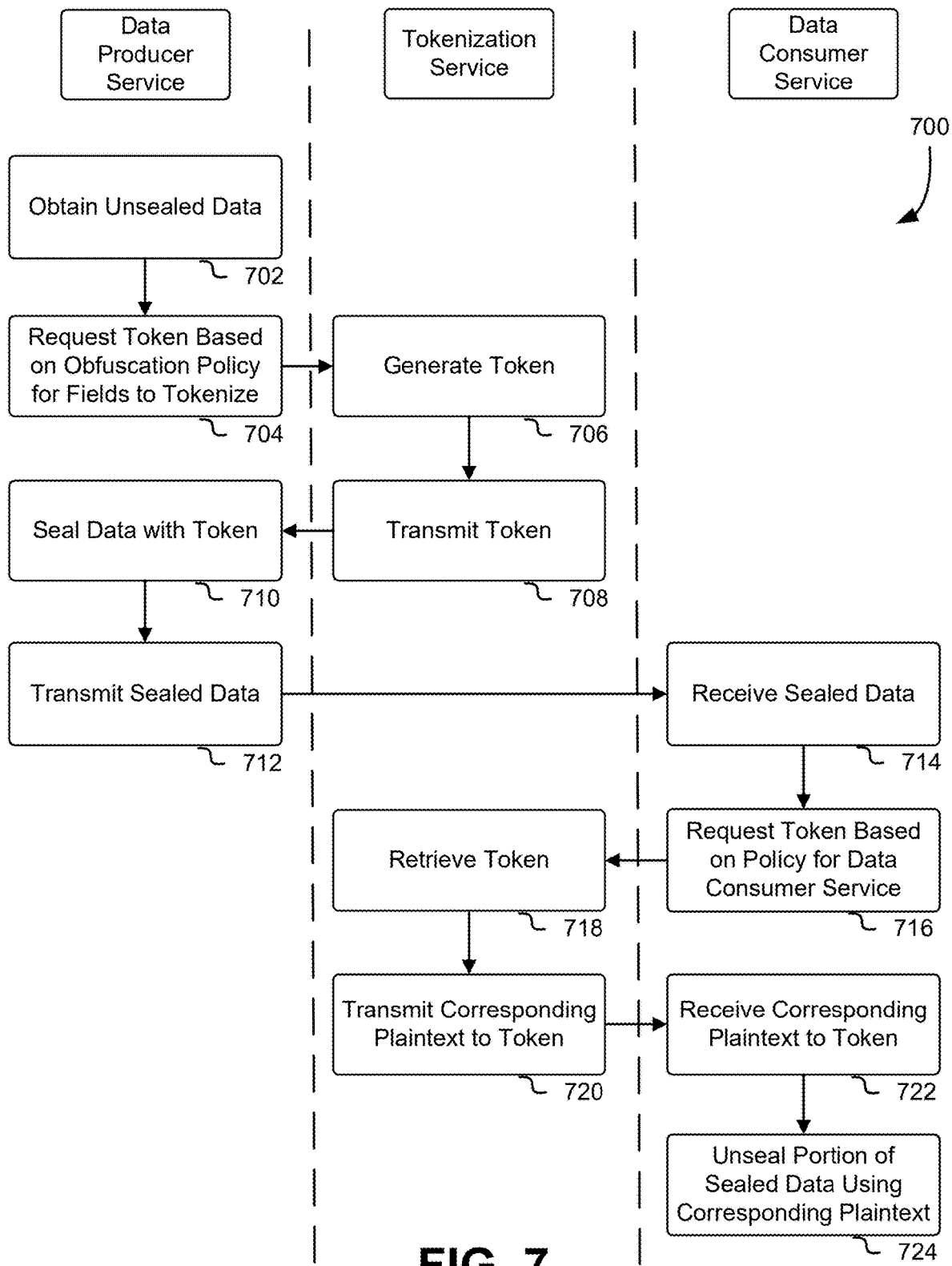
FIG. 7 shows an illustrative example of a process that, as a result of being performed by a data producer service, tokenization service, and data consumer service, seal and unseal data.

FIG. 7 shows an illustrative example of a process 700 that, as a result of being performed by a data producer service, tokenization service, and data consumer service, seals and unseals data. A message diagram illustrates an embodiment of a system for sealing data at a data producer service using a token from a tokenization service and unsealed the sealed data using the token from the tokenization service at a data consumer service. In an environment, as a result of the process illustrated in FIG. 1, a data producer service obtains 702 unsealed data. The obtained data can be structured or unstructured. If the data is unstructured, the data producer service can structure the data in data payload as discussed herein.

The data producer service can obfuscate the data using tokenization and/or encryption. To obtain a token, a data producer service can access a token from a local token cache or obtain a token from a tokenization service when the local token cache lacks a tokenized mapping of the data to be obfuscated. The data producer service requests 704 the token corresponding to the plaintext data to be obfuscated from the tokenization service. In an embodiment, the data producer service authenticates the identity of the data producer with the tokenization service. In an embodiment, the data producer service determines that the data producer is authorized to request the token from the tokenization service, such as based on a tokenization policy. A tokenization policy can include an obfuscation policy, such as described herein. The tokenization service generates 706 a token, such as in response to authenticating and authorizing the request 704. In an embodiment, the tokenization service can alternatively obtain the requested token by accessing a data store of tokens or accessing a token cache, such as described herein. The tokenization service transmits 708 the token to the data producer service.

The data producer service seals 710 the obtained unsealed data with the token, such as in a manner indicated by an obfuscation policy. For example, the data producer service can tokenize a data value of a data field. The data producer service transmits 712 the sealed data to the data consumer service. The data producer service can encrypt the sealed data for transmission, such that the data producer service transmits encrypted sealed data to the data consumer service.

The data consumer service receives 714 the sealed data. If the sealed data was encrypted, the data consumer service can decrypt the encrypted sealed data. The data consumer service requests 716 a token to unseal the sealed data based on an access policy of the data consumer service. The request can include the sealed data. The token can be requested from a local token cache of the data consumer service or from a tokenization service, such as the tokenization service 110 described above. In an embodiment including requesting the token from the tokenization service, the tokenization service authenticates the identity of the data consumer service before providing the requested token to the data consumer service.

In an embodiment, an authorization component on the data consumer service determines whether the data consumer service is authorized to request the token from the tokenization service. In an embodiment, an authorization component on the tokenization service determines whether the data consumer service is authorized to be provided the requested token. The tokenization service retrieves 718 the token from memory accessible to the tokenization service. The tokenization service can store tokens in a token cache or a data store as described herein. The tokenization service transmits 720 the corresponding plaintext of the token to the data consumer service. In an embodiment, the tokenization service transmits the plaintext corresponding to the sealed data which the data consumer service requested to unseal. The tokenization service can also transmit a mapping between the plaintext values and the tokenized values to the data consumer service. The data consumer service receives 722 the corresponding plaintext of the token and uses the corresponding plaintext to unseal 724 a portion of the sealed data. Unsealing the portion of sealed data can produce a plaintext data value corresponding to a data field indicated as accessible to the data consume service by an access policy. In an embodiment, the authorization component can utilize a mapping between the token and the corresponding plaintext to unseal the portion of sealed data.

Figure 8:
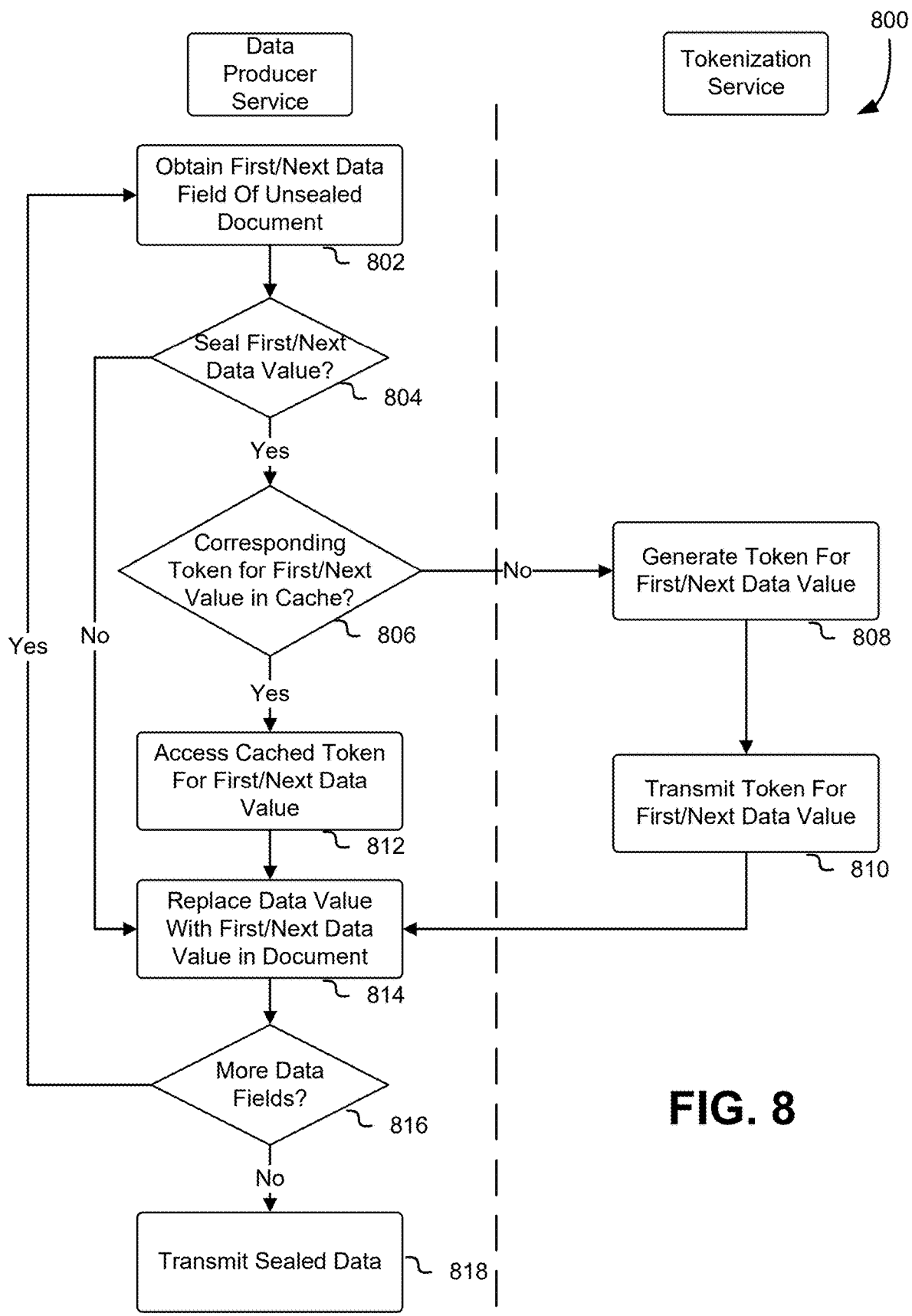
FIG. 8 shows an illustrative example of a process that, as a result of being performed by a data producer service and a tokenization service, seals data fields within an unsealed document.

FIG. 8 shows an illustrative example of a process 800 that, as a result of being performed by a data producer service and a tokenization service, seals data fields within an unsealed document. A message diagram illustrates an embodiment of a system for sealing data at the data producer service. A data producer service obtains 802 a first/next field of an unsealed document. The unsealed document can be a structured data document containing one or more data fields. Each data field can contain plaintext data values. The data producer service determines 804 whether to seal the first/next data value. The data producer service can determine whether to seal the first/next data value according to an obfuscation policy, such as described herein.

If a data seal component of the data producer service determines to seal the first/next data value, the data producer then determines 806 whether the corresponding tokenized data for the first/next value is in a local token cache. A token cache can store token mappings according to the frequency in which the token mappings are accessed by services, such as discarding the least recently used mapping first (LRU). Additional examples of frequency based cache methods include first in first out (FIFO), last in first out (LIFO), first in last out (FILO), time aware least recently used (TLRU), most recently used (MRU), etc. In at least one embodiment, a data seal component queries a token cache using the first/next data value to request a corresponding obfuscated first/next data value and the token cache returns the corresponding obfuscated first/next data value which was stored in the cache. In some cases, the size of the token cache is configurable based on how much system memory is available.

If the data seal component of the data producer determines that the corresponding tokenized data is not in the token cache, the data producer service causes the tokenization service to generate 808 the tokenized value corresponding to the unsealed first/next data value. The tokenization service transmits 810 the tokenized value for the first/next data value to the data producer service. If the data producer determines that the corresponding tokenized data not in the token cache, the data producer service accesses 812 the cached tokenized value from the token cache.

If the data producer services determines to seal the first/next data value, the data producer service replaces 814 the data value with the obtained tokenized value corresponding to the first/next data value. If the data producer service determines not to seal the first/next data value, the data producer service can delete the first/next data value, maintain the plaintext data value in the first/next data field, or replace the first/next data field with a value, such as an indicator identifying that the data field was changed.

The data producer service then identifies 816 whether there are additional data fields to seal. If additional data fields are to be sealed, such as in accordance with an obfuscation policy as described herein, the data producer service repeats steps 802-814 for the next data field. If no additional data fields are to be sealed, the data producer service transmits 818 the produced sealed data, such as to another service.

Figure 9:
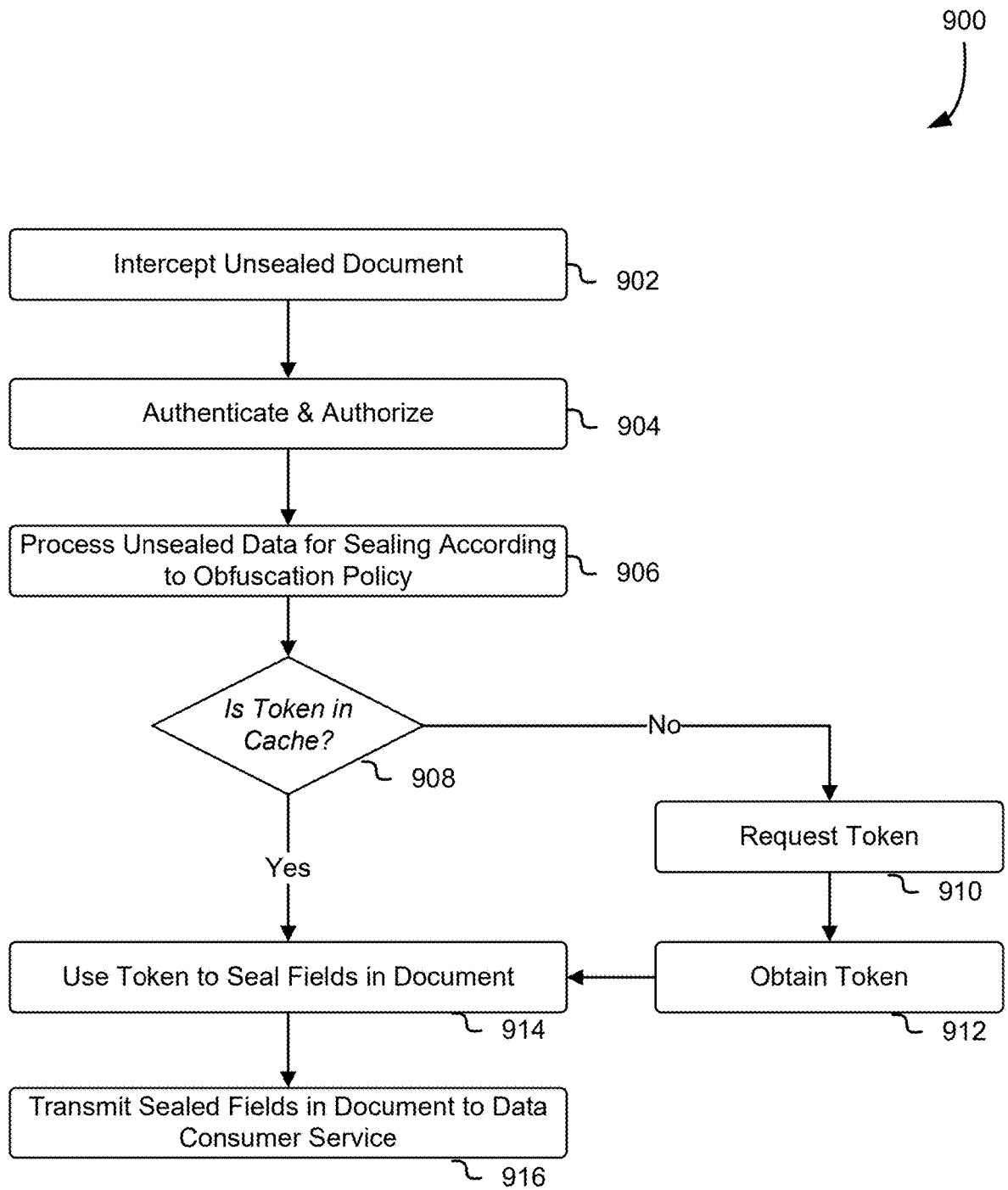
FIG. 9 is a flowchart depicting an embodiment of a system for a data producer service sealing fields in a document using tokenization.

FIG. 9 shows an illustrative example of a process 900 to seal fields in a document using tokenization, in accordance with at least one embodiment. In at least one embodiment, some or all of the process 900 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be performed by a data producer service, such as described herein, and which may be implemented in accordance with those described in connection with FIG. 1.

In at least one embodiment, a system such as a data producer service intercepts 902 an unsealed document. For example, the data producer service can intercept the unsealed document as the unsealed document is routed from an application layer to a transport layer. In some cases, a data producer service intercepts a partially unsealed document that is to be sealed prior to transmission across a network such as the Internet. The unsealed document can be a structured data file or data payload, such as described herein.

A data producer service performs 904 one or more authentication and authorization operations. Examples of authentication operations include the data producer service verifying the provenance of the unsealed data and authenticating the identity of the data producer service with a computing resource service provider and/or tokenization service. Examples of authorization operations include accessing an obfuscation policy to verify that the data producer service is permitted to operate on one or more data fields contained in the unsealed document, to communicate with a tokenization service, to communicate with a key management service, or to communicate with another service, such as a data consumer service. The obfuscation policy can include rules or policies regarding the manner in which data fields can be obfuscated, such as by encryption or tokenization as described herein.

A data producer service processes 906 the unsealed data for sealing according to the obfuscation policy. For example, the obfuscation policy can indicate that certain data fields are to be encrypted while other data fields are to be tokenized. The obfuscation policy can indicate the manner of obfuscation by a characteristic of the data field, such as a data type associated with a particular data field.

To obfuscate data by tokenization, a data producer service determines whether 908 the corresponding token for a plaintext data value is stored in a local token cache of the data producer service. For example, the data producer service can obtain the corresponding tokenized data value for a plaintext data vale from a token cache that is local to the data producer service, which may be implemented in connection with FIGS. 1 and 2. The data producer service can query a database of the token cache based on a plaintext data value to identify a token mapping between the plaintext data value and a corresponding tokenized data value.

If the data producer service lacks the token, a data producer service can request 910 the token from a tokenization service. The tokenization service can be a remote service to the data producer service. For example, the tokenization service can be a service that resides outside of the data producer service, such as being separated by a network connection. The tokenization service can process application programming interface (API) calls related to tokenization, such as can be included in a request from the data producer service. For example, the data producer service can request a token by passing a plaintext data value by a Tok( ) tokenize API call to the tokenization service.

In response, a tokenization service can return the tokenized data such that the data producer service obtains 912 the corresponding token. The tokenization service can return the tokenization service can return the tokenized data value or can return both of the mapping between the plaintext data value and the tokenized data value. If the local token cache of the data producer service contained the token, the data producer service can obtain the token from the token cache. The data producer service can add the obtained token to a local token cache.

A data producer service uses 914 the obtained token to obfuscate the plaintext data value and thereby seal the corresponding data field in the document. For example, data producer service may replace one or more plaintext data values with corresponding tokenized data values in accordance with the obfuscation policy. If the obfuscation policy indicated that the data field be encrypted, the data producer service can alternatively encrypt the plaintext data value using a cryptographic key, such as indicated by the obfuscation policy for the data field or a data field of an indicated data type.

A data producer service transmits 916 the sealed data fields to a data consumer service. The data producer service can transmit the sealed data fields over a network, such as a local area network (LAN), virtual private network (VPN), the internet, or some combination thereof. The data producer service can encrypt the sealed document for transmission. The data producer service can transmit the sealed document to the data consumer service by a TLS protocol, such as described herein.

Figure 10:
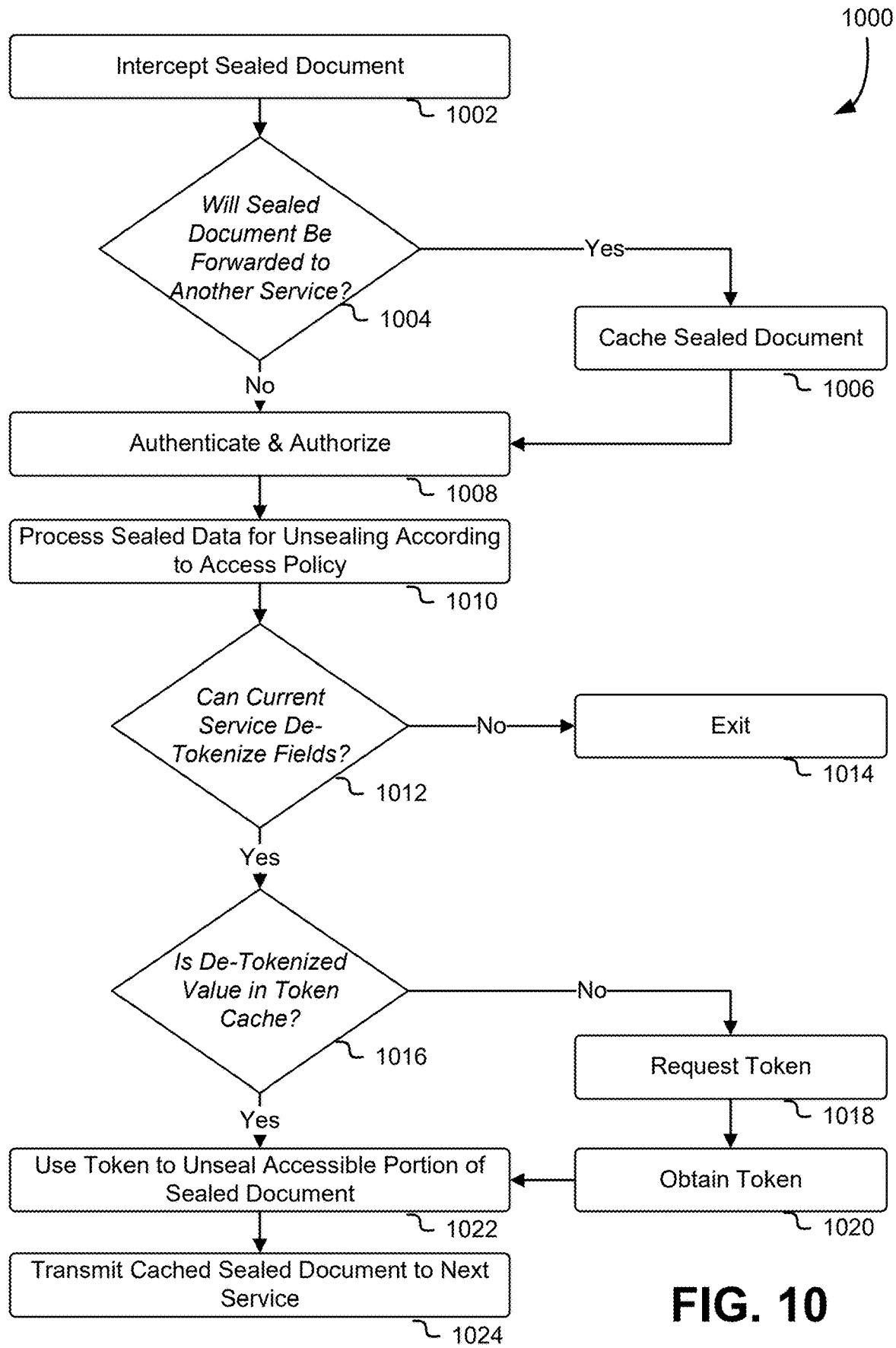
FIG. 10 is a flowchart depicting an embodiment of a system for a data consumer service unsealing fields in a document using de-tokenization.

FIG. 10 shows an illustrative example of a process 1000 for unsealing fields in a document using de-tokenization, in accordance with at least one embodiment. In at least one embodiment, some or all of the process 1000 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1000 may be performed by any suitable system, such as a data consumer service, which may be implemented in accordance with those described in connection with FIG. 1.

The data consumer service intercepts 1002 a sealed document. For example, the data consumer service can intercept the sealed document as the sealed document is routed from a transport layer to an application layer. For example, a tokenization service interceptor of the data consumer service can intercept traffic based on a characteristic, identifier, or associated metadata of the traffic. The tokenization service interceptor can intercept a structured data file based on a header of the structured data file, e.g., a payload header as described herein.

The data consumer service determines whether 1004 the sealed document is to be forwarded by the data consumer service to another service. For example, metadata included with the sealed document can indicate one or more destinations in addition to the indicated destination of the application layer. Metadata can be included in a header of a document, such as in accordance with an embodiment as described in FIG. 6. One or more additional destinations can be subsequent data consumer services following a first destination of the application layer of the intercepting data consumer service. For example, a sealed data file can indicate a first destination as data consumer service A and ordered subsequent destinations of data consumer service B followed by data consumer service C.

If the sealed document is to be forwarded, the data consumer service caches 1006 the sealed document. A service of the data consumer service can replicate or copy the sealed document to store the replicated sealed token in a memory cache accessible to the data consumer service. For example, a tokenization service interceptor can identify that a sealed data file is to be forwarded to another service such as described above and store a copy of the sealed document in a data store local to the data consumer service. In an embodiment, the received sealed data file is stored in a data cache and a copy of the sealed data file is utilized for performing operations in connection with de-obfuscation of the tokenized sealed data file. If the sealed document is not to be forwarded, the system performing the process may proceed directly to performing one or more authentication and/or authorization operations.

A data consumer service performs one or more authentication and authorization operations 1008. Examples of authentication operations include the data consumer service verifying the provenance of the sealed data and authenticating the identity of the data consumer service with a computing resource service provider and/or tokenization service. Examples of authorization operations include accessing an access policy to verify that the data consumer service is permitted to operate on one or more data fields contained in the sealed document, to communicate with a tokenization service, to communicate with a key management service, or to communicate with another service, such as another data consumer service. The access policy can include rules or policies regarding the manner in which sealed data fields can be de-obfuscated, such as by decryption or de-tokenization as described herein.

A data consumer service processes 1010 the sealed data for unsealing according to the access policy. For example, the access policy can indicate that certain data fields are to be decrypted while other data fields are to be de-tokenized. The access policy can indicate the manner of de-obfuscation by a characteristic of the data field, such as a data type associated with a particular data field.

Based on the access policy, the data consumer service determines whether 1012 the data consumer service can de-tokenize one or more fields of the sealed data. The data consumer service can determine it can de-tokenize one or more fields of the sealed data based on the access policy indicating the data consume service is authenticated and authorized to perform de-obfuscation operations on the intercepted sealed document.

If a data consumer service is unable to de-tokenize fields, the data consumer service exits 1014 the unsealing workflow. Exiting the workflow can include transmitting a notification to another service identifying the sealed document and that the data consumer service was unable to de-tokenize the one or fields. In an embodiment, the data consumer service can exit the workflow by forwarding the cached sealed document to another service. The data consumer service can also exit the workflow for de-tokenizing the sealed document and enter a workflow for decrypting one or more fields of the sealed document.

Based on the access policy, if a data consumer service is able to de-tokenize one or more fields of the sealed document, the data consumer service then determines whether 1016 the data consumer service is storing the corresponding de-tokenized value of the sealed data field in a local token cache. For example, the data consumer service can obtain the corresponding plaintext for a tokenized data vale from a local token cache local to the data consumer service, which may be implemented in connection with FIGS. 1 and 3. The data consumer service can query a database of the token cache based on a tokenized data value to identify a token mapping between tokenized data value and a corresponding plaintext data value.

If a data consumer service lacks the token, the data consumer service can request 1018 the token from a tokenization service. The tokenization service can be a remote service to the data consumer service. For example, the tokenization service can be a service that resides outside of the data producer service, such as being separated by a network connection. The tokenization service can process application programming interface (API) calls related to tokenization, such as can be included in a request from the data consumer service. For example, the data consumer service can request a plaintext value corresponding to a tokenized value by passing the tokenized data value by a Detok( ) de-tokenize API call to the tokenization service.

In response, a tokenization service can return the de-tokenized data such that the data consumer service obtains 1020 the corresponding plaintext data value. The tokenization service can return both of the mapping between the plaintext data value and the tokenized data value. If the local token cache of the data consumer service contained the plaintext data value, the data consumer service can obtain the plaintext data value from the token cache. The data consumer service can add the obtained plaintext mapping to the tokenized data to a local token cache.

A data consumer service uses 1022 the plaintext data value to de-obfuscate and thereby unseal the corresponding tokenized data field in the sealed document. For example, the data producer service can replace tokenized data values with corresponding plaintext data values in accordance with the access policy. If the access policy indicated that the data field be decrypted, the data consumer service can alternatively decrypt the encrypted data value using a cryptographic key, such as indicated by the access policy for the data field or a data field of an indicated data type.

A data consumer service transmits 1024 the cached sealed document to another data consumer service. The data consumer service can encrypt the sealed document for transmission. The data consumer service can transmit the sealed document to the other data consumer service by a TLS protocol, such as described herein.

Figure 11:
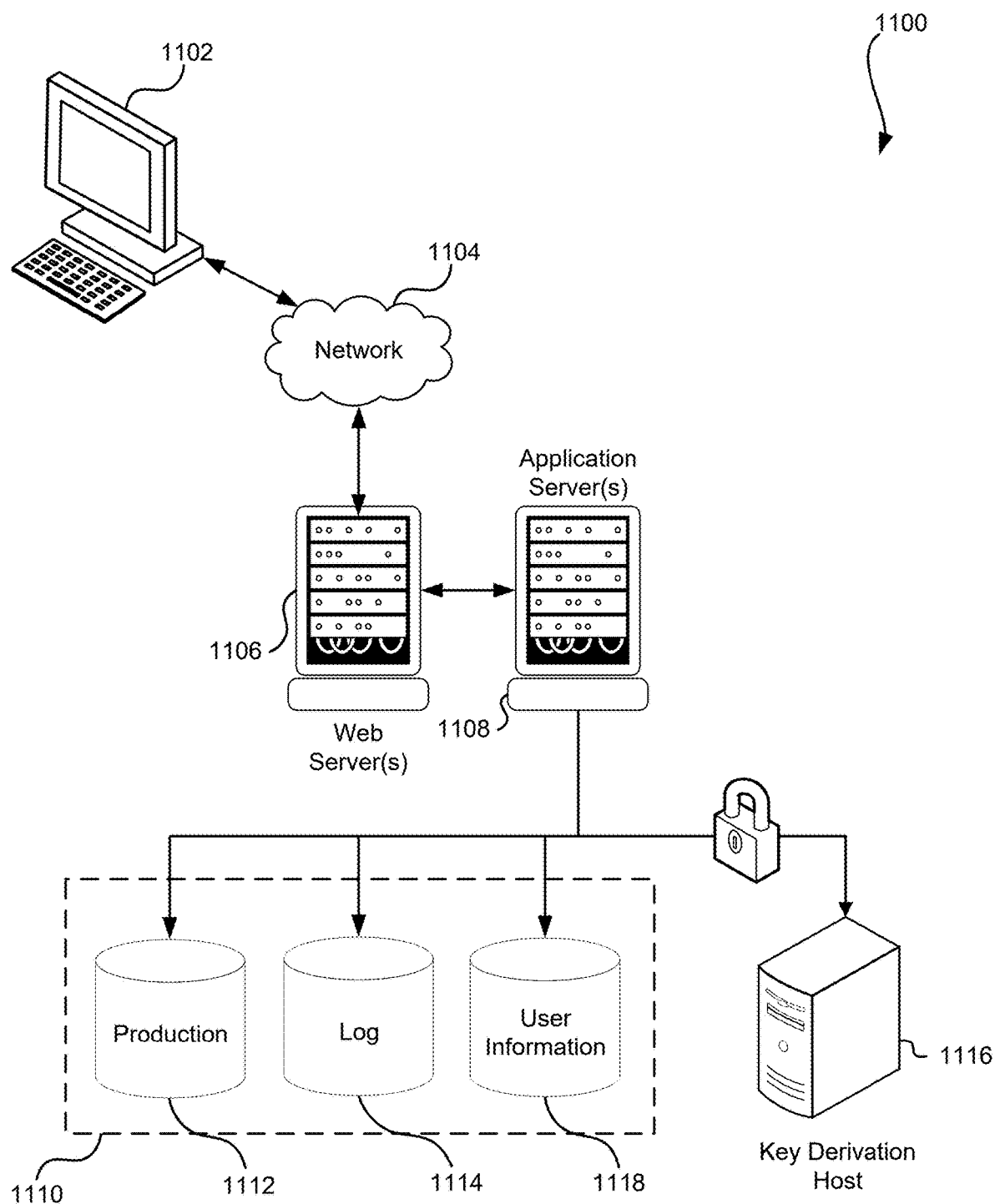
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments such as those described in connection with FIGS. 1-10. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof.

In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. For example, an individual application service 1108 and data store 1110 may perform tasks specific to a data producer service, a data consumer service, and a tokenization service. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1118, which are used to serve content for the production side. In an embodiment, a key derivation host 1116 is used to generate cryptographic information, such as cryptographic keys and/or plaintext-to-tokenized mappings. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

Tokenization may refer to a mechanism in which data or information is tokenized and represented in a different format. An input data x may be tokenized to generate a token y. Tokens, in at least some cases, are generated in such a way that it is mathematically impossible or impractical to determine the corresponding input data that was used to produce the token. For example, a one-way function may be used to tokenize data x such that $y=f(x)$ where $f(\ )$ is a one-way function. In various embodiments, mathematical functions are used to deterministically tokenize an input data value x to an output token value y such that $y=Tok(x)$ wherein $Tok(\ )$ is a tokenization function. In some embodiments, a tokenization function is implemented as a cryptographic hash function that generates keyed-hash message authentication codes (HMACs). For example, a tokenization service may generate tokens by accepting, a data field or value and a cryptographic key.

In at least some embodiments, a structured payload includes data fields or data values {D1, D2, D3 . . . } and tokens {T1, T2, T3 . . . } are generated by tokenizing the individual data fields or values such that tokens are produced as {Tok(D1), Tok(D2), Tok(D3) . . . }. In some embodiments, less than all data fields are tokenized, which may be encoded in a policy that specifies a mapping that indicates which types of data should be tokenized, encrypted, or otherwise obfuscated. For example, a policy may indicate that a first data field should be tokenized, a second data field should be encrypted, and a third data field should be left in plaintext—for data fields {D1, D2, D3} this may produce a sealed payload {Tok(D1), Enc(D2), D3}.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising, at a first service of a computing resource service provider:
   obtaining, from a first application running on the first service, a structured data payload comprising a plurality of data fields;
   determining, according to a first policy associated with a data field of the plurality of data fields, a manner in which to obfuscate the data field;
   obfuscating the data field according to the determined manner, thereby obtaining an obfuscated data field;
   generating a sealed data payload by at least replacing the data field with the obfuscated data field;
   transmitting the sealed data payload; and
   at a second service of the computing resource service provider:
      obtaining the sealed data payload;
      generating an output data payload by at least de-obfuscating the obfuscated data field according to a second policy associated with the second service; and
      making the output data payload available to a second application running on the second service,
      wherein one or more of the data fields of the plurality of structured data fields of the structured data payload were de-obfuscated according to a third policy applicable to the one or more of the data fields of the plurality of structured data fields of the structured data payload.

2. The computer-implemented method of claim 1, wherein the obfuscated data field is generated using a one-way function.

3. The computer-implemented method of claim 1, wherein obfuscating the data field comprises:
   requesting, from a cache, a product for obfuscating the data field;
   as a result of the cache being unable to provide the product:
      submitting a request to a third service of the computing resource service provider, the request encoding the data field; and
      receiving, from the third service, the obfuscated data field; and
   storing, in the cache, the obfuscated data field in association with the data field.

4. The computer-implemented method of claim 1, wherein the output data payload made available to the second application comprises:
   one or more obfuscated data fields that the second service lacks access to, according to the second policy; and
   one or more plaintext data fields that the second service has access to, according to the second policy, the one or more plaintext data fields including at least the data field.

5. A system, comprising:
   at least one computing device configured to implement one or more services, the one or more services to:

obtain an inbound data payload comprising a plurality of obfuscated data fields;
determine that at least a portion of the obfuscated data fields can be de-obfuscated by the system according to a policy applicable to the portion of the obfuscated data fields;
obtain corresponding plaintext data fields for at least the portion of the obfuscated data fields, based on the policy;
replace the at least the portion of the obfuscated data fields with the corresponding plaintext data fields, thereby producing an output data payload;
provide the output data payload to an application running on the system; and
determine that at least a further portion of the obfuscated data fields can be de-obfuscated by the system according to a further policy, wherein the portion of the obfuscated data fields is different from the further portion of the obfuscated data fields and the policy is different from the further policy.

6. The system of claim 5, wherein:
the one or more services are one or more first services; and
the at least one computing device is further configured to implement one or more second services, the one or more second services to:
cause the application running on the system to process at least a portion of the plaintext data fields;
obtain the output data payload comprising the plaintext data fields;
determine, according to a second policy associated with the plaintext data fields, a manner to obfuscate the plaintext data fields, the manner indicative of a recipient;
obfuscate the plaintext data fields according to the determined manner, thereby obtaining a corresponding second obfuscated data fields;
generate a second output data payload by at least replacing the plaintext data fields with the corresponding second obfuscated data fields; and
transmit the second output data payload to the recipient.

7. The system of claim 6, wherein the portion of the obfuscated data fields is a first subset of obfuscated data fields and a second computing device is configured to implement one or more third services, the one or more third services to:
obtain the second output data payload comprising the second obfuscated data fields;
determine that at least a second subset of the obfuscated data fields can be de-obfuscated by the system according to a third policy applicable to the second computing device, wherein the second subset is different from the first subset;
obtain corresponding plaintext data fields for at least the second subset of the obfuscated data fields, the second subset of the obfuscated data fields different than the portion of the obfuscated data fields;
replace at least a second portion of the obfuscated data fields with the corresponding plaintext data fields, thereby producing third output data payload; and
provide the third output data payload to the application running on the second computing device.

8. The system of claim 5, wherein the at least one computing device is further configured to implement one or more additional services, the one or more additional services to determine that at least a portion of the obfuscated data fields can be de-obfuscated by the system according to a policy applicable to the system further determines that at least:
a first subset of the obfuscated data fields can be de-obfuscated by the system using a first cache that maps the first subset to a corresponding set of plaintext data fields; and
a second subset of the obfuscated data fields can be de-obfuscated via one or more requests submitted, by the system to a service of the system, the one or more requests encoding the second subset.

9. The system of claim 5, wherein the at least one computing device is further configured to implement one or more additional services, the one or more additional services to:
store the inbound data payload comprising a plurality of obfuscated data fields;
perform one or more operations using the plaintext data fields; and
transmit, to a second application running on a second system, the inbound data and information indicative of a result of performing the one or more operations.

10. The system of claim 5, wherein the at least one computing device is configured to implement additional one or more services, the additional one or more services to obtain the inbound data payload comprising the plurality of obfuscated data fields between an application layer of the at least one computing device and a network layer by which the at least one computing device transmits the output data payload to a recipient.

11. The system of claim 5, wherein the portion of the plurality of obfuscated data fields includes all obfuscated data fields included in the inbound data payload.

12. The system of claim 5, wherein a set of instructions that cause the system to obtain an inbound data payload comprising a plurality of obfuscated data fields further cause the system to intercept the inbound data payload as a result of the inbound data payload being routed to the application.

13. A non-transitory computer-readable storage medium storing executable instructions that, as a result of being executed by one or more processors of a computer system, cause the computer system to at least:
intercept a structured data payload utilized by an application running on a first service, the structured data payload comprising a plurality of data fields;
identify at least a portion of the plurality of data fields to be obfuscated;
cause the portion of the plurality of data fields to be obfuscated, thereby producing one or more obfuscated data fields;
transmit the one or more obfuscated data fields in a payload over a communications network; and
determine that at least a first portion and a second portion of the data fields can be de-obfuscated by the computer system according to a first policy and second policy respectively, wherein the first portion and the second portion of the data fields are different.

14. The non-transitory computer-readable storage medium of claim 13, wherein:
the instructions include further instructions that, as a result of being executed by the one or more processors of the computer system, further cause the computer system to determine a manner in which to obfuscate respective data fields of the portion of the plurality of data fields by one of tokenization or encryption, the determination in accordance with a policy, the policy specifying a manner of obfuscation for individual data fields of the plurality of data fields; and the instructions to cause the portion of the plurality of data fields to be obfuscated include instructions that, as a result of being executed by the one or more processors, include further instructions that cause the computer system to obfuscate the portion of the plurality of data fields in accordance with the determined manner.

15. The non-transitory computer-readable storage medium of claim 13, wherein the instructions include further instructions that, as a result of being executed by the one or more processors of the computer system, further cause the computer system to determine to obfuscate the portion of the plurality of data fields based on a policy indicating a manner of obfuscation corresponding to a data type of the portion of the plurality of data fields.

16. The non-transitory computer-readable storage medium of claim 13, wherein the instructions to provide the one or more obfuscated data fields in place of the portion of the plurality of data fields include further instructions that, as a result of being executed by the one or more processors of the computer system, further cause the computer system to:
    encrypt the one or more obfuscated data fields to produce an encrypted and obfuscated data fields; and
    transmit the encrypted and obfuscated data fields across a communication network.

17. The non-transitory computer-readable storage medium of claim 13, wherein the instructions that cause the computer system to provide the one or more obfuscated data fields further cause the computer system to provide the one or more obfuscated data fields at a transport layer.

18. The non-transitory computer-readable storage medium of claim 13, wherein the instructions that cause the computer system to identify at least a portion of the plurality of data fields to be obfuscated further cause the computer system to identify at least a portion of the plurality of data fields to be obfuscated according to a policy applicable to the system, the policy indicative of how one or more entities are allowed access to one or more data fields of the plurality of data fields.

19. The non-transitory computer-readable storage medium of claim 13, wherein the instructions that cause the computer system to cause the portion of the plurality of data fields to be obfuscated, thereby producing one or more obfuscated data fields further comprise instructions to:
    request, from a cache, a result for obfuscating the portion of the plurality of data fields;
    when the cache is unable to provide the result for obfuscating the portion of the plurality of data fields, request from an additional service the result for obfuscating the portion of the plurality of data fields; and
    store, in the cache, the obfuscated data field in association with the portion of the plurality of data fields.

20. The non-transitory computer-readable storage medium of claim 13, wherein a reference associates one data field of the plurality of data fields with an additional one or more fields of the plurality of data fields.

\* \* \* \* \*